(12) United States Patent
Li

(10) Patent No.: US 11,310,409 B2
(45) Date of Patent: Apr. 19, 2022

(54) FOCUSING METHOD, DEVICE, AND MOBILE TERMINAL

(71) Applicant: GUANGDONG OPPO MOBILE TELECOMMUNICATIONS CORP., LTD., Guangdong (CN)

(72) Inventor: Xiaopeng Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 62 days.

(21) Appl. No.: 16/711,066

(22) Filed: Dec. 11, 2019

(65) Prior Publication Data

US 2020/0120260 A1    Apr. 16, 2020

Related U.S. Application Data

(63) Continuation of application No. PCT/CN2018/088936, filed on May 30, 2018.

(30) Foreign Application Priority Data

Jun. 16, 2017 (CN) .......................... 201710458995.X

(51) Int. Cl.
   *H04N 5/232* (2006.01)
   *H04N 5/225* (2006.01)
   *H04M 1/02* (2006.01)

(52) U.S. Cl.
   CPC ...... *H04N 5/23212* (2013.01); *H04M 1/0264* (2013.01)

(58) Field of Classification Search
   CPC ............ H04N 5/2258; H04N 5/23212; H04M 1/0264

(Continued)

(56) References Cited

U.S. PATENT DOCUMENTS 5,005,086 A * 4/1991 Iwamoto ............ H04N 5/23212
                                                 348/356
9,549,115 B1 * 1/2017 Baldwin .............. H04N 5/2258
(Continued)

FOREIGN PATENT DOCUMENTS

CN    102257422    11/2011
CN    103024272    4/2013
(Continued)

OTHER PUBLICATIONS

WIPO, ISR for PCT/CN2018/088936, Aug. 29, 2018.
(Continued)

*Primary Examiner* — Anthony J Daniels
(74) *Attorney, Agent, or Firm* — Hodgson Russ LLP

(57) ABSTRACT

A focusing method, device, and mobile terminal are provided. The focusing method is applied in the mobile terminal. The mobile terminal includes a first camera having a first lens module and a second camera having a second lens module. In the focusing method, an in-focus distance corresponding to a first in-focus position of the first lens module is obtained. The first in-focus position indicates a position at which the first lens module is in focus. A second in-focus position of the second camera corresponding to the in-focus distance is obtained. The second in-focus position indicates a position at which the second lens module is in focus. The second camera is in focus at the time when the second lens module is in focus. The second lens module is driven to move to the second in-focus position and to focus.

19 Claims, 5 Drawing Sheets

S102
An in-focus distance, which is corresponding to an in-focus position of a lens of the first camera that is in focus, may be obtained when the first camera is in focus S104
An in-focus position of a lens of a second camera, which is corresponding to the in-focus distance, is obtained S106
The second camera is focusing, by moving the lens of the second camera to the in-focus position that indicates the second camera is in focus

(58) Field of Classification Search
USPC .......................................................... 348/345
See application file for complete search history.

(56) References Cited

U.S. PATENT DOCUMENTS

| | | | | |
|---|---|---|---|---|
| 9,769,371 | B1* | 9/2017 | Azuma | H04N 5/232122 |
| 9,918,065 | B2* | 3/2018 | Geiss | H04N 13/207 |
| 10,382,665 | B2* | 8/2019 | Sa | H04N 5/23293 |
| 2008/0218611 | A1* | 9/2008 | Parulski | H04N 5/23212 |
| | | | | 348/262 |
| 2009/0015703 | A1* | 1/2009 | Kim | H04N 5/232933 |
| | | | | 348/333.12 |
| 2012/0051730 | A1 | 3/2012 | Cote et al. | |
| 2013/0016245 | A1* | 1/2013 | Yuba | H04N 5/232123 |
| | | | | 348/222.1 |
| 2013/0021447 | A1* | 1/2013 | Brisedoux | H04N 5/23232 |
| | | | | 348/47 |
| 2015/0015769 | A1* | 1/2015 | Lin | H04N 5/247 |
| | | | | 348/345 |
| 2015/0264247 | A1* | 9/2015 | Teng | G02B 7/102 |
| | | | | 348/353 |
| 2016/0173757 | A1 | 6/2016 | Choi | |
| 2016/0295097 | A1* | 10/2016 | Shanmugavadivelu | ...................... |
| | | | | H04N 5/2254 |

FOREIGN PATENT DOCUMENTS

| | | |
|---|---|---|
| CN | 104410783 | 3/2015 |
| CN | 104717419 | 6/2015 |
| CN | 105812835 | 7/2016 |
| CN | 105827909 | 8/2016 |
| CN | 106488135 | 3/2017 |
| CN | 106488137 | 3/2017 |
| CN | 106556961 | 4/2017 |
| CN | 107147848 | 9/2017 |
| CN | 107277348 | 10/2017 |
| KR | 20110015208 | 2/2011 |
| WO | 2015015383 | 2/2015 |

OTHER PUBLICATIONS

SIPO, First Office Action for CN Application No. 201710458995.X, dated Apr. 2, 2019.
EPO, Extended European Search Report for EP Application No. 18818235.6, dated Aug. 28, 2020.
EPO, Office Action for EP Application No. 18818235.6, dated May 26, 2020.
IPI, Office Action for IN Application No. 201917053240, dated Apr. 19, 2021.
EPO, Office Action for EP Application No. 18818235.6, dated Feb. 9, 2022.

* cited by examiner

FOCUSING METHOD, DEVICE, AND MOBILE TERMINAL

CROSS-REFERENCE TO RELATED APPLICATION

This application is a continuation of International Application No. PCT/CN2018/088936, filed on May 30, 2018, which claims priority to Chinese Patent Application No. 201710458995.X, filed on Jun. 16, 2017. The entire disclosures of the aforementioned applications are incorporated herein by reference.

TECHNICAL FIELD

The present disclosure relates to a technical field of mobile terminal in general. More particularly, and without limitation, the disclosed embodiments relate to a focusing method, a device, and a mobile terminal.

BACKGROUND

With a development of smart mobile terminals, a smart mobile terminal is widely used for taking photos and videos. Requirements for a shooting effect of smart mobile terminals are getting stricter. When shooting an object with a camera, the camera needs to determine an in-focus distance that ensures to capture a clear image, and then the camera may capture images of the object basing on the in-focus distance, so that the images are clear enough.

SUMMARY

A focusing method, device, and mobile terminal are provided, in accordance with embodiments of the present disclosure, which can ensure that the dual-camera module focuses more conveniently.

In a first aspect, a focusing method is provided. In the focusing method. The focusing method is applied in the mobile terminal. The mobile terminal includes a first camera having a first lens module and a second camera having a second lens module. In the focusing method, an in-focus distance corresponding to a first in-focus position of the first lens module is obtained, when the first camera has been in focus. The first in-focus position indicates a position at which the first lens module is in focus. The first camera is in focus at the time when the first lens module is in focus that is in focus. A second in-focus position of the second camera corresponding to the in-focus distance is obtained. The second in-focus position indicates a position at which the second lens module is in focus. The second camera is in focus at the time when the second lens module is in focus. The second lens module is driven to move to the second in-focus position and to focus.

In a second aspect, a focusing device is provided. The focus device is applied in a mobile terminal. The mobile terminal includes a camera module having a first camera having a first lens module and a second camera having a second lens module. The second camera is adjacent to the first camera. The focusing device includes an obtaining module, and a driving module. The obtaining module is configured to obtain an in-focus distance corresponding to a first in-focus position of the first lens module when the first camera has been in focus, wherein the first in-focus position indicates a position at which the first lens module is in focus; wherein the first camera is in focus at the time when the first lens module is in focus. The obtaining module is further configured to obtain a second in-focus position of the second lens module corresponding to the in-focus distance. The second in-focus position indicates a position at which the second lens module is in focus. The second camera is in focus at the time when the second lens module is in focus. The driving module is configured to drive the second lens module to move to the second in-focus position and to focus.

In a third aspect, a mobile terminal is provided. The mobile terminal includes a camera module, a memory and a processor. The camera module includes a first camera having a first lens module and a second camera having a second lens module. The second camera is adjacent to the first camera. The memory stores a computer program, and the processor is configured to execute the computer program to perform the following operations including:

obtaining an in-focus distance corresponding to a first in-focus position of the first lens module when the first camera has been in focus, wherein the first in-focus position indicates a position at which the first lens module is in focus; wherein the first camera is in focus at the time when the first lens module is in focus;

obtaining a second in-focus position of the second lens module corresponding to the in-focus distance; wherein the second in-focus position indicates a position at which the second lens module is in focus; wherein the second camera is in focus at the time when the second lens module is in focus; and driving the second lens module to move to the second in-focus position and to focus.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION

Figure 1:
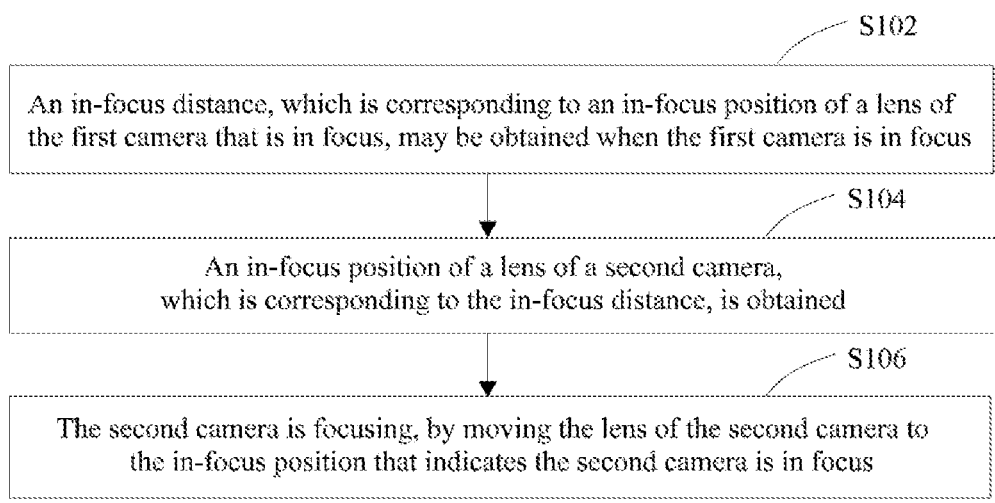
FIG. 1 illustrates a schematic flowchart of a focusing method, in accordance with an embodiment of the present disclosure.

The technical solutions in the embodiments of the present disclosure will be clearly and completely described in the following with reference to the accompanying drawings. It is understood that the specific embodiments described herein are merely illustrative of the disclosure and are not intended to limit the disclosure. It should also be noted that, for ease of description, only some but not all of the structures related to the present disclosure are illustrated in the drawings. All other embodiments obtained by those skilled in the art based on the embodiments of the present disclosure without any creative efforts are fall in the scope claimed by the present disclosure.

FIG. 1 illustrates a schematic flowchart of a focusing method, in accordance with an embodiment of the present disclosure. As illustrated in FIG. 1, the focusing method may begin from block S102 to block S106.

Figure 2:
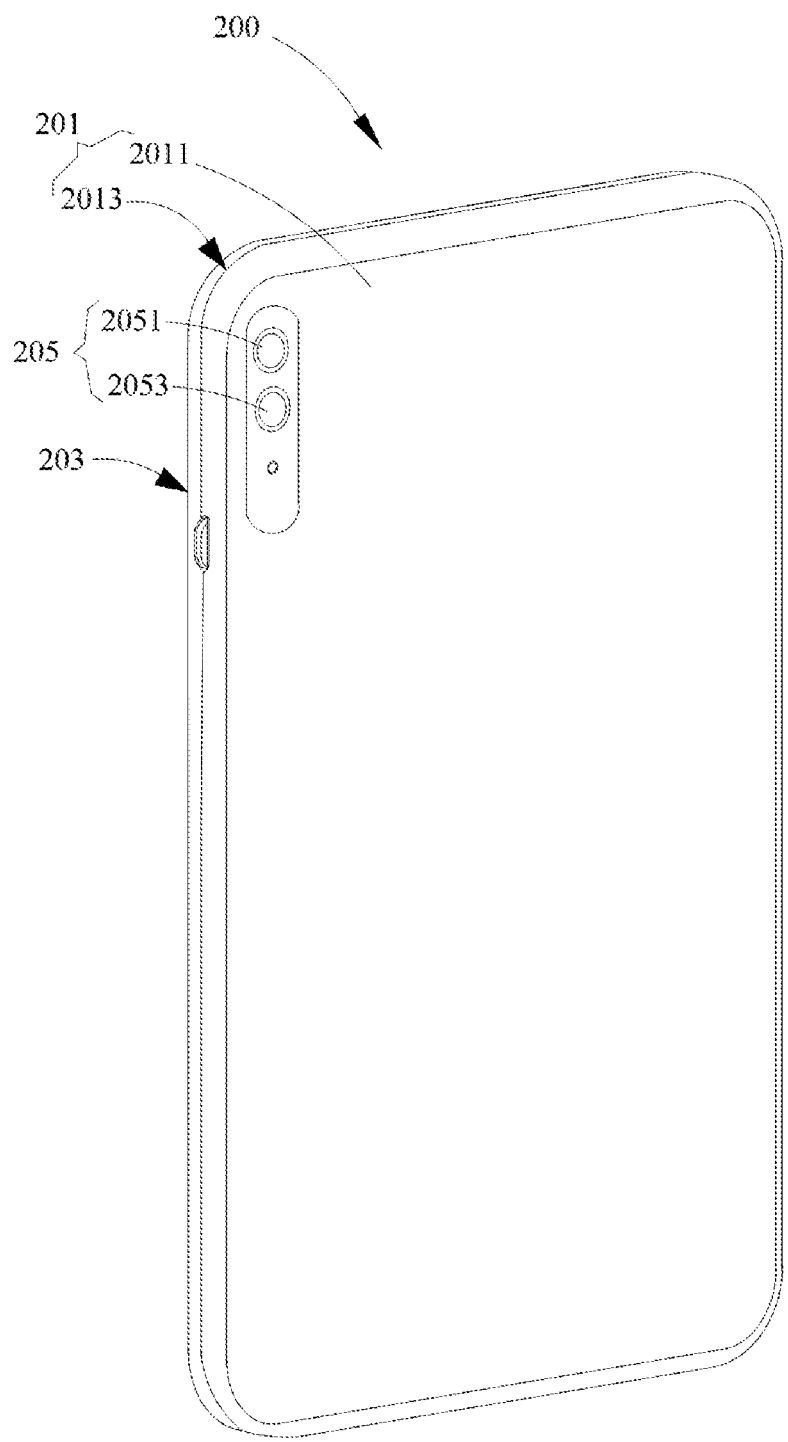
FIG. 2 illustrates a perspective view of a mobile terminal, in accordance with an embodiment of the present disclosure.

As illustrated in FIG. 2, in the embodiments of the present disclosure, the focusing method may be applied in and be performed by a mobile terminal 100. The mobile terminal 100 may include a housing 201, a display panel 203, and a camera module 205. The housing 201 includes a rear cover 2011 and a front cover 2013 opposite to the rear cover 2011. The display panel 203 is attached to the front cover 2013. The camera module 205 may be disposed in the housing 201, and both exposed from the rear cover 2011 so as to capture an image of outside environment. The camera module 205 may focus on a target object when capturing images by applying the focusing method according to the embodiments of the present disclosure. In some embodiments, the camera module 205 may include a first camera 2051 and a second camera 2053 adjacent to the first camera 2051. In some embodiment, the first camera 2051 is juxtaposed with the second camera 2053. Such that the rear camera module is a dual-camera module, and the images capture by the dual-camera module may have a high quality.

At block S102, an in-focus distance, which is corresponding to an in-focus lens position of the first camera that is in focus, may be obtained when the first camera has been in focus. The in-focus distance indicates an in-focus position of the lens of the first camera. The in-focus position indicates a position of the lens of the first camera, at which the first camera is in focus.

In some embodiments, when a rear camera module of a mobile terminal is a dual-camera module including two cameras, the dual-camera module can be used for focusing. In general, a dual-camera module may include a common camera and a depth camera. In some embodiments, the dual-camera module may include a color camera and a black-and-white camera. In other embodiments, the dual-camera module may include a wide camera and a telephoto camera. Different shooting effects may be achieved by different dual-cameral module. The first camera refers to a main camera of the rear camera module of the mobile terminal. When the rear camera module of the mobile terminal is a dual-camera module having a main camera and a secondary camera, the main camera and the secondary camera of the dual-camera module can be distinguished according to camera identification (ID)s thereof.

For example, in some embodiment, the rear camera module of the mobile terminal may include a main camera having a first camera ID (identification), and a secondary camera having a second camera ID, when the rear camera module is a dual-camera module. The main camera and the secondary camera can be distinguished according to the camera ID (identification)s thereof.

In some embodiments, the mobile terminal may further include at least one front camera disposed on a front side thereof. The front camera may be configured with a third camera ID. Each of the main camera, the secondary camera, the front camera, may include at least one lens for collecting light.

For example, in the mobile terminal, a camera ID may be determined as 0 for indicating the main camera, and a camera ID may be determined as 1 for indicating the secondary camera, and a camera ID may be determined as 2 for the front camera of the mobile terminal. When a camera application in the mobile terminal is activated and starts to focus, the mobile terminal may search for the main camera according to the camera ID thereof, and move a lens of the main camera to focus. In an operation of moving the lens of the main camera to focus, the main camera may perform a first scanning operation to obtain a location range of an in-focus lens position of the first camera that is in focus; then the main camera may perform a second scanning operation to obtain the in-focus lens position that is in focus, after the location range of the in-focus lens position is obtained. After obtaining the in-focus lens position, the mobile terminal may obtain an in-focus distance corresponding to the in-focus lens position. When the lens of the main camera are moved, by the mobile terminal, to arrive at the in-focus lens position, an image captured by the main camera, is in focus. In other words, the image captured by the mobile terminal is clear. The in-focus distance indicates a straight-line distance between the lens of the main camera and an object on which the first camera is focusing on.

At block S104, an in-focus lens position of a second camera, which is corresponding to the in-focus distance, is obtained.

The second camera refers to the secondary camera of the rear camera module of the mobile terminal. The main camera and the secondary camera are distinguished according to the camera IDs thereof. The main camera and the secondary camera may have different numbers of pixels, or may have the same numbers of pixels. The mobile terminal pre-stores a correspondence between the in-focus distance and the lens position of each of the cameras. When the rear camera module includes multiple cameras, and specifications of the cameras are different, the correspondences, between the in-focus distance and the lens position of each of the cameras, may be different. A correspondence map of the camera ID of every camera, the in-focus lens position of every camera, and the in-focus distance may be pre-stored in the mobile terminal. After obtaining the in-focus distance corresponding to the in-focus lens position of the main camera that is in focus, the in-focus lens position of the secondary camera, which is corresponding to the in-focus distance, can be obtained by searching correspondingly up in the correspondence map. As illustrated in Table 1, a correspondence map of the in-focus lens position and the in-focus distance is illustrated.

Table 1 correspondence map of the in-focus lens position of every camera and the in-focus distance

TABLE 1 correspondence map of the in-focus lens position of every camera and the in-focus distance

| In-focus lens position of lens (mm) | In-focus distance (cm) |
|---|---|
| 0.1 | 20 |
| 0.2 | 40 |
| 0.3 | 60 |
| 0.6 | 120 |
| 2.5 | 500 |

At block S106, the second camera is focusing, by moving the lens of the second camera to the in-focus lens position that indicates the second camera has been in focus.

The mobile terminal may move the lens of the secondary camera to the in-focus lens position by activate a motor, when the in-focus lens position, that indicates the second camera is in focus, is obtained by the mobile terminal. And the mobile terminal may obtain an in-focus area when moving the secondary camera to focus. The in-focus area indicates an area of the image, in which the object is substantially clear displayed. In some embodiments, operations of moving the lens of the secondary camera to focus is the same as the operations of moving the lens of the main camera to focus.

In the prior art, a main camera and a secondary camera of a dual-camera module is focusing independently when the dual-camera module of a prior mobile terminal focus. The dual-camera module then capture an image after the main camera and the secondary camera are in focus, which results in that an in-focus distance of the main camera and an in-focus distance of the secondary camera is different because of the operation of focusing independently. Therefore, a focus of an image capture by the main camera and a focus of an image captured by the secondary camera is different, and a processed image based on the two images may have a poor quality. In the focusing method according to the embodiments of the present disclosure, the main camera and the secondary camera are focusing on substantially identical focus area according to the correspondence map of the in-focus lens position of every camera and the in-focus distance. Thereby a quality of a processed image based on two images respectively captured by the main camera and the secondary camera is improved.

In one embodiment, before the in-focus distance corresponding to the in-focus distance of the lens of the first camera is obtained, the focusing method further includes the following operations: driving the first camera to focus; obtaining a current position of the first camera at the time when a current frame of image is in focus, and determining the in-focus lens position of the first camera as the current position corresponding the current frame of image that is in-focus.

Before the mobile terminal obtains the in-focus distance corresponding to the in-focus lens position of the main camera, the main camera is driven to focus by the mobile terminal, and the mobile terminal is configured to determine whether or not the current frame of image is in focus. The operation of determining whether or not the current frame of image is in focus may include the operations of: driving the lens of the main camera to perform a pre-scanning, and obtaining every focus value corresponding to every frame of image when the lens of the main camera is scanning, the image is captured by the first camera during the moving of the first lens module, and the focus value indicates a clarity of a target object on the image; and the pre-scanning is stopped and an accurate scanning is performed at the time when the focus value corresponding to the current frame of image is smaller than that of a previous frame. In the pre-scanning process, the lens of the main camera is approaching in a stepwise manner, and a movement of the lens of the main camera is relatively large at each time of approaching. After the pre-scanning is finished, the mobile terminal drives the lens of the main camera to perform the accurate scanning. In the accurate scanning process, the lens of the main camera is moved and retreated, and the movement of the lens of the main camera is relatively smaller than that in the pre-scanning process. When a focus value of an intermediate frame of three consecutive frames of images is greater than the focus value of each of a previous and a consecutive frames of the intermediate frame, the accurate scanning is stopped. A fitted parabola is forming according to the focus values corresponding to the three consecutive frames of images. And the lens of the first camera is moved according to the fitted parabola. The main camera is determined as in focus at the time when the lens arrives at a position corresponding to a vertex of the fitted parabola. When the mobile terminal determines that the main camera has been in focus and the current frame of image is in focus, the lens position corresponding to the current frame of image is recorded as the in-focus lens position when the main camera has been in focus.

In the focusing method according to the embodiments of the present disclosure, the in-focus lens position of the first camera is determined as the current position corresponding to the current frame of image, only at the time when the current frame of image is in focus. Thereby a system resource and the power consumption of the mobile terminal is reduced.

In one embodiment, before the in-focus distance corresponding to the in-focus lens position of the first camera is obtained, the focusing method further includes the following operations: driving the first camera to focus; obtaining every position corresponding to every frame of image, which is captured by the first camera during the moving of the first lens module; determining the lens position corresponding to a frame of image that is in focus as the in-focus lens position of the first camera.

Before the mobile terminal obtains the in-focus distance corresponding to the in-focus lens position of the main camera, the main camera is driven to focus by the mobile terminal, and the terminal is configured to records a current position corresponding to the current frame of image. At the time when the current frame of image is determined as in focus, an in-focus lens position, corresponding to an in-focus frame of image, is obtained; and the mobile terminal may search for the in-focus distance corresponding to the in-focus lens position.

In one embodiment, correspondences of a device identification number of every camera, the lens position of every camera, and the in-focus distance are pre-stored in the mobile terminal. The operation, of obtaining an in-focus distance corresponding to the in-focus lens position of a first camera that is in focus, may include the following operations: obtaining the device identification number of the first camera; searching for the in-focus distance corresponding to the in-focus lens position of the first camera that is in focus, according to the device identification number of the first camera. The operation, of obtaining an in-focus lens position of a second camera, which is corresponding to the in-focus distance, may include the following operations: obtaining the device identification number of the second camera; and searching for, according to the device identification number of the second camera, the in-focus lens position of the second camera, which is corresponding to the in-focus distance.

Correspondences of the device identification number of every camera, the lens positions of every camera, and the in-focus distance are pre-stored in the mobile terminal.

Different cameras with different device identification numbers may have different in-focus distances that is corresponding to the in-focus lens positions of the cameras. When the main camera has been in focus, the mobile terminal may obtain the in-focus position of lens of the main camera, and configured to search for, according to the device identification numbers and the lens position of the main camera, the in-focus distance corresponding to the in-focus lens position of the main camera. After obtaining the in-focus distance, the mobile terminal may search for the lens position of the secondary camera, which is corresponding to the in-focus distance. The device identification number of the camera is a string for uniquely identifying the corresponding camera, such as a camera ID. As illustrated in Table 2, Table 2 illustrates a correspondence map of the device identification number of the camera, the lens position of the camera, and the in-focus distance.

Table 2 correspondence map of the device identification number of every camera, the lens position of every camera, and the in-focus distance.

TABLE 2 correspondence map of the device identification number of every camera, the lens position of every camera, and the in-focus distance

| device identification number | Lens position (mm) | In-focus distance (cm) |
|---|---|---|
| 0 | 0.2 | 40 |
| 0 | 0.3 | 60 |
| 0 | 0.6 | 120 |
| 0 | 2.5 | 500 |
| 1 | 0.1 | 40 |
| 1 | 0.15 | 60 |
| 1 | 0.3 | 120 |
| 1 | 1.25 | 500 |

In the focusing method according to the embodiments of the present disclosure, the in-focus distance is determined according to the lens position of the main camera, and the in-focus lens position of the secondary camera is determined according to the in-focus distance. Such that a focus area of the secondary camera is the same as that of main first camera. Thereby the mobile terminal with the dual-camera module may focus conveniently, and a quality of images capture by the dual-camera module is improved.

In one embodiment, the focusing method further include an operation of capturing images via the first camera and the second camera simultaneously when the second camera has been in focus.

When the second camera has been in focus, the mobile terminal is configured to capture images with the first camera and the second camera simultaneously. In the focusing method according to the embodiments of the present disclosure, both of the first camera and the second camera are simultaneously used for capturing images when the dual-camera module is in focus, which ensures a better consistency of the images and improves a quality of a processed image that is processed according to the images captured by the first camera and the second camera.

The steps in the flowchart of the focusing method according to the embodiments of the present disclosure are sequentially illustrated in accordance with the indication of the arrow, but the steps are not necessarily performed in the order indicated by the arrow. Except as explicitly stated herein, the execution of these steps is not strictly limited, and may be performed in other order. Furthermore, at least some of the steps in the flowchart of the focusing method according to the embodiments of the present disclosure may include multiple sub-steps or multiple stages, which are not necessarily performed at the same time, but may be executed at different times. The order of execution is not necessarily performed sequentially, but may be performed alternately or alternately with at least a portion of other steps or sub-steps or stages of other steps.

Figure 3:
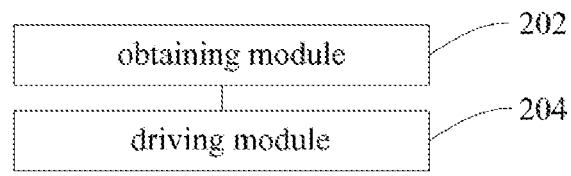
FIG. 3 illustrates a schematic view of functional blocks of a focusing device, in accordance with an embodiment of the present disclosure.

FIG. 3 illustrates a schematic view of functional blocks of a focusing device, in accordance with an embodiment of the present disclosure. As illustrated in FIG. 3, the focusing device includes an obtaining module 202 and a driving module 204.

The obtaining module 202 is configured to obtain an in-focus distance corresponding to an in-focus lens position of a first camera that is in focus, when the first camera has been in focus; and configured to obtain an in-focus lens position of a second camera that is in focus, which is corresponding to the in-focus distance.

The driving module 204 is configured to drive the lens of the second camera to arrive the in-focus lens position of the second camera and to focus.

Figure 4:
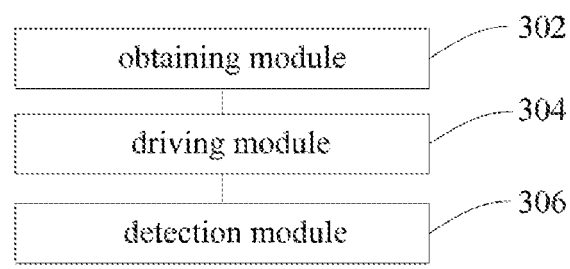
FIG. 4 illustrates a schematic view of functional blocks of a focusing device, in accordance with another embodiment of the present disclosure.

FIG. 4 illustrates a schematic view of functional blocks of a focusing device, in accordance with another embodiment of the present disclosure. As illustrated in FIG. 4, the focusing device includes an obtaining module 302, a driving module 304, and a detection module 306. The obtaining module 302 and the driving module 304 in FIG. 4 have the same functions as those in FIG. 3.

The driving module 304 is further configured to drive the first camera to focus before obtaining the in-focus distance corresponding to the in-focus lens position of the first camera that is in focus.

The detecting module 306 is configured to determine where or not a current frame of image is in focus, obtain a current position of the first camera at the time when the current frame of image is in focus, and determine the in-focus lens position of the first camera as the current position of the lens that is in focus.

In one embodiment, before the in-focus distance corresponding to the in-focus lens position of the first camera is obtained, the driving module 304 is further configured to drive the first camera to focus, and obtain every position corresponding to every frame of image, which is captured by the first camera during the moving of the first lens module.

The detection module 306 is further configured to determine the lens position corresponding to a frame of image that is in focus as the in-focus lens position of the first camera.

In one embodiment, correspondences of device identification number of every camera, the lens positions of every camera, and the in-focus distances are pre-stored in the mobile terminal. The obtaining module 202 is further configured to:

obtaining the device identification number of the first camera; and searching for the in-focus distance corresponding to the in-focus lens position of the first camera that is in focus, according to the device identification number of the first camera; and obtaining the device identification number of the second camera; and searching for, according to the device identification number of the second camera, the in-focus lens position of the second camera, which is corresponding to the in-focus distance.

Figure 5:
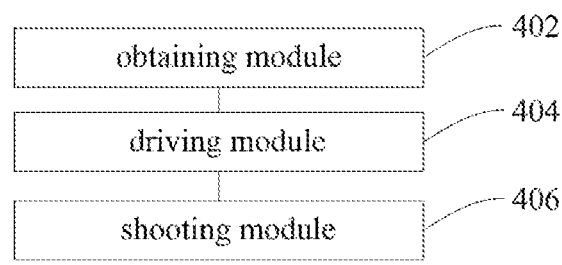
FIG. 5 illustrates a schematic view of functional blocks of a focusing device, in accordance with still another embodiment of the present disclosure.

FIG. 5 illustrates a schematic view of functional blocks of a focusing device, in accordance with still another embodiment of the present disclosure. As illustrated in FIG. 5, the focusing device includes an obtaining module 402, a driving module 404, and a shooting module 406. The obtaining module 402 and the driving module 404 in FIG. 5 have the same functions as those in FIG. 3.

The shooting module 406 is configured to capture images with the first camera and the second camera simultaneously when the second camera has been in focus.

The division of each module in the above focusing devices is for illustrative purposes only. In other embodiments, the focusing device may be divided into different modules as needed to perform all or part of the functions of the focusing device.

Each of the above-described focusing devices may be implemented in whole or in part by software, hardware, and combinations thereof. The above modules may be embedded in the hardware, in the processor, or in the memory in the server, or may be stored in the memory of the server, so that the processor can involve the above modules to perform corresponding operations of. As used in this disclosure, the terms "component", "module" and "system" and the like are intended to mean a computer-related entity, which may be hardware, a combination of hardware and software, software, or software in execution. For example, a component can be, but is not limited to, a process running on a processor, a processor, an object, an executable, a thread of execution, a program, and/or a computer. By way of illustration, both an application running on a server and a server can be a type of a component. One or more components can reside in a process and/or executed thread, and the components can be located within one computer and/or distributed in two or more computers.

A computer readable storage medium is provided, in accordance with the embodiments of the present disclosure. The computer readable storage medium stores a plurality of instructions, and the instructions are adapted to be executed by a processor to perform the following operations (1) to (3):

At operation (1), obtaining an in-focus distance corresponding to a lens position of a first camera that is in focus, may be obtained when the first camera has been in focus.

In some embodiment, at operation (1), when a rear camera module of a mobile terminal is a dual-camera module including two cameras, the dual-camera module can be used for focusing. In general, a dual-camera module may include a common camera and a depth camera. In some embodiments, the dual-camera module may include a color camera and a black-and-white camera. In other embodiments, the dual-camera module may include a wide camera and a telephoto camera. Different shooting effects may be achieved by different dual-cameral module. The first camera refers to a main camera of the rear camera module of the mobile terminal. When the rear camera module of the mobile terminal is a dual-camera module having a main camera and a secondary camera, the main camera and the secondary camera of the dual-camera module can be distinguished according to camera identification (ID)s thereof. For example, in the mobile terminal, a camera ID may be determined as 0 for indicating the main camera, and a camera ID may be determined as 1 for indicating the secondary camera, and a camera ID may be determined as 2 for a front camera of the mobile terminal. When a camera application in the mobile terminal is activated and starts to focus, the mobile terminal may search for the main camera according to the camera ID thereof, and move a lens of the main camera to focus. In an operation of moving the lens of the main camera to focus, the main camera may perform a first scanning operation to obtain a location range of an in-focus lens position of the first camera that is in focus; then the main camera may perform a second scanning operation to obtain the in-focus lens position that is in focus, after the location range of the in-focus position is obtained. After obtaining the in-focus lens position, the mobile terminal may obtain an in-focus distance corresponding to the in-focus position. When the lens of the main camera are moved, by the mobile terminal, to arrive at the in-focus position, an image captured by the main camera, is in focus. In other words, the image captured by the mobile terminal is clear. The in-focus distance indicates a straight-line distance between the lens of the main camera and an object on which the first camera is focusing on.

At operation (2), obtaining an in-focus lens position of a second camera, which is corresponding to the in-focus distance.

In some embodiment, at operation (2), the second camera refers to the secondary camera of the rear camera module of the mobile terminal. The main camera and the secondary camera are distinguished according to the camera IDs thereof. The main camera and the secondary camera may have different numbers of pixels, or may have the same numbers of pixels. The mobile terminal pre-stores correspondences between the in-focus distance and the in-focus lens position of each of the cameras. When the rear camera module includes multiple cameras, and specifications of the cameras are different from each other, the correspondences, between the in-focus distance and the in-focus lens position of each of the cameras, may be different. A correspondence map of the camera ID, the in-focus lens position, and the in-focus distance may be pre-stored in the mobile terminal. After obtaining the in-focus distance corresponding to the in-focus lens position of the main camera that is in focus, the in-focus lens position of the secondary camera, which is corresponding to the in-focus distance, can be obtained by searching correspondingly up in the correspondence map. As illustrated in Table 1, a correspondence map of the in-focus lens position of every camera and the in-focus distance is illustrated.

At operation (3), moving the second camera to the in-focus position that indicates the second camera is in focus, and the second camera is focusing during movement.

In some embodiment, at operation (3), the mobile terminal may move the lens of the secondary camera to the in-focus lens position by activate a motor, when the in-focus position, that indicates the second camera is in focus, is obtained by the mobile terminal. And the mobile terminal may obtain an in-focus area when moving the secondary camera to focus. In some embodiments, operations of moving the lens of the secondary camera to focus is the same as the operations of moving the lens of the main camera to focus.

In one embodiment, before the in-focus distance corresponding to the in-focus distance of the lens of the first camera is obtained, the focusing method further includes the following operations: driving the first camera to focus; obtaining a current position of the first camera at the time when a current frame of image is in focus, and determining the in-focus lens position of the first camera as the current position corresponding the current frame of image.

Before the mobile terminal obtains the in-focus distance corresponding to the in-focus lens position of the main camera, the main camera is driven to focus by the mobile terminal, and the mobile terminal is configured to determine whether or not the current frame of image is in focus. The operation of determining whether or not the current frame of image is in focus may include the following operations: driving the lens of the main camera to perform a pre-scanning, and obtaining every focus value corresponding to every frame of image when the lens of the main camera is scanning; the image is captured by the first camera during the moving of the first lens module, and the pre-scanning is stopped and an accurate scanning is performed at the time when the focus value corresponding to the current frame of image is smaller than that of a previous frame. In the pre-scanning process, a movement of the lens of the main camera is relatively large at each time of approaching. After the pre-scanning is finished, the mobile terminal drives the lens of the main camera to perform the accurate scanning. In the accurate scanning process, the lens of the main camera is moved and retreated, and the movement of the lens of the main camera is relatively smaller than that in the pre-scanning process. When a focus value of an intermediate frame of three consecutive frames of images is greater than the focus value of each of a previous and a consecutive frames of the intermediate frame, the accurate scanning is stopped. A fitted parabola is forming according to the focus values corresponding to the three consecutive frames of images. And the lens of the first camera is moved according to the fitted parabola. The main camera is determined as in focus at the time when the lens arrives at a position corresponding to the vertex of the fitted parabola. When the mobile terminal determines that the main camera has been in focus and the current frame of image is in focus, the lens position corresponding to the current frame of image is recorded as the in-focus lens position when the main camera has been in focus.

In one embodiment, before the in-focus distance corresponding to the in-focus lens position of the first camera is obtained, the focusing method further includes the following operations: driving the first camera to focus; obtaining every position corresponding to every frame of image, which is captured by the first camera during the moving of the first lens module; determining the lens position corresponding to a frame of image that is in focus as the in-focus lens position of the first camera.

Before the mobile terminal obtains the in-focus distance corresponding to the in-focus lens position of the main camera, the main camera is driven to focus by the mobile terminal, and the terminal is configured to records a current position corresponding to the current frame of image. At the time when the current frame of image is determined as in focus, an in-focus lens position, corresponding to an in-focus frame of image, is obtained; and the mobile terminal may search for the in-focus distance corresponding to the in-focus position.

In one embodiment, correspondences of device identification numbers of every cameras, the lens position of every camera, and the in-focus distances are pre-stored in the mobile terminal. The operation, of obtaining an in-focus distance corresponding to the in-focus lens position of a first camera that is in focus, may include the following operations: obtaining the device identification number of the first camera; searching for the in-focus distance corresponding to the in-focus lens position of the first camera that is in focus, according to the device identification number of the first camera. The operation, of obtaining an in-focus lens position of the second camera, which is corresponding to the in-focus distance, may include the following operations: obtaining the device identification number of the second camera; and searching for, according to the device identification number of the second camera, the in-focus lens position of the second camera, which is corresponding to the in-focus distance.

Correspondences of device identification number of every cameras, the lens positions of every camera, and the in-focus distance are pre-stored in the mobile terminal.

Different cameras with different device identification numbers may have different in-focus distances that is corresponding to the in-focus lens positions of the cameras. When the main camera has been in focus, the mobile terminal may obtain the in-focus position of lens of the main camera, and configured to search for, according to the device identification numbers and the lens position of the main camera, the in-focus distance corresponding to the in-focus lens position of the main camera. After obtaining the in-focus distance, the mobile terminal may search for the lens position of the secondary camera, which is corresponding to the in-focus distance. The device identification number of the camera is a string for uniquely identifying the corresponding camera, such as a camera ID.

In one embodiment, the first camera and the second camera capture images simultaneously when the second camera has been in focus.

When the second camera has been in focus, the mobile terminal is configured to capture images with the first camera and the second camera simultaneously. In the focusing method according to the embodiments of the present disclosure, both of the first camera and the second camera are simultaneously used for capturing images when the dual-camera module is in focus, which ensures a better consistency of the images and improves a quality of a processed image that is processed according to the images captured by the first camera and the second camera.

Figure 6:
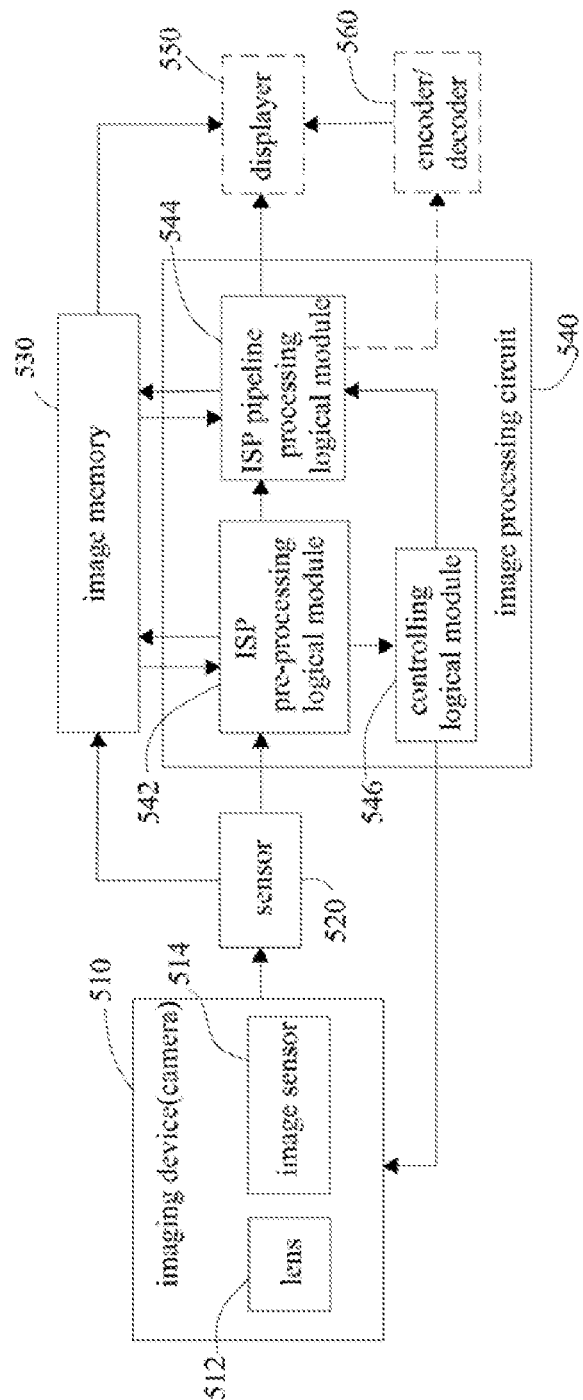
FIG. 6 illustrates a schematic view of an image processing circuit, in accordance with still another embodiment of the present disclosure.

A mobile terminal is also provided, in accordance with the embodiments of the present disclosure. As illustrated in FIG. 6, the mobile terminal includes an image processing circuit 540 and an imaging device 510. The mobile terminal may include the same components as the mobile terminal 200 in FIG. 2, while the imaging device may refer to the rear camera 205 of the mobile terminal 200. The image processing circuit is configured to process images captured by the imaging device. The image processing circuit 540 can be implemented by hardware and/or software components, and can include various processing units defining an Image Signal Processing (ISP) pipeline. FIG. 6 illustrates a schematic view of an image processing circuit, in accordance with still another embodiment of the present disclosure. As illustrated in FIG. 6, for convenience of explanation, only various aspects of the image processing technique related to the embodiment of the present disclosure are illustrated.

As illustrated in FIG. 6, the image processing circuit 540 includes an ISP pre-processing logical module 542, an ISP pipeline processing logical module 544, and a controlling logical module 546. An image data captured by the imaging device 510 is processed by the ISP pre-processing logical module 542. The ISP pre-processing logical module 542 may analyze the image data to capture image statistics for determining one or more controlling parameters of at least one of the ISP pipeline processing logical module 544 and the imaging device 510. The imaging device 510 can include at least one camera having an image sensors 514 and one or more lenses 512. The image sensor 514 may include a color filter array (such as a Bayer filter). The image sensor 514 may be configured to capture light intensity and wavelength information via each imaging pixel of image sensor 514, and configured to provide a group of raw image data that may be processed by the ISP pre-processing logical module 542. For example, an interface of a sensor 520 may be provided in the mobile terminal and configured to receive an output data of the imaging device 510 and transmits, according to a type of the interface of the sensor 520, the raw image data to the ISP pre-processing logical module 542. The interface of the sensor 520 may include any one of a SMIA (Standard Mobile Imaging Architecture) interface, other serial or parallel camera interfaces, or any combination of the above.

The ISP pre-processing logical module 542 processes the raw image data pixel by pixel in a variety of formats. For example, each of image pixels can have a bit depth of 8, 10, 12, or 14 bits, and the ISP pre-processing logical module 542 can perform one or more image processing operations on the raw image data, for collecting statistical information about the image data. The image processing operations can be performed according to the same or different bit depth precision.

In some embodiment, the mobile terminal further includes an image memory 530. The image memory 530 is configured to store image data. The ISP pre-processing logical module 542 can also receive pixel data from the image memory 530. For example, the interface of the sensor 520 may transmit the raw pixel data to the image memory 530, which is then provided to the ISP pre-processing logical module 542 for further processing. The image memory 530 can be part of a memory device, a storage device, or an independent dedicated memory of an electronic device. The image memory 530 can include a direct memory access (DMA) features.

When receiving the raw image data from the interface of the sensor 520 or from the image memory 530, the ISP pre-processing logical module 542 can perform one or more image processing operations, such as a time domain filtering. A processed image data is generated and can be sent to the ISP pipeline processing logical module 544 or the image memory 530 for further processing before being displayed. The ISP pipeline processing logical module 544 can also receive a pre-processing image data directly from the ISP pre-processing logical module 542, or receive a pre-processing image data from the image memory 530, and process the pre-processing image data in the original domain as well as in color space of RGB and YCbCr. A processed image data is generated after being processed by the ISP pipeline processing logical module 544, and can be transmitted to a displayer (such as the display panel 203 in FIG. 2) for displaying. Thereby a user can see the processed image, and/or the processed image may be further processed by a graphics engine or a Graphics Processing Unit (GPU). Additionally, the processed image from the ISP pipeline processing logical module 544 can also be transmitted to the image memory 530. The displayer can read image data, from image memory 530, of the processed image. In one embodiment, image memory 530 can be configured to implement one or more frame buffers. Furthermore, the processed image from the ISP pipeline processing logical module 544 can be transmitted to an encoder/decoder 560 to encode/decode image data. An encoded image data can be saved and decompressed before being displayed on the displayer device.

The image statistics determined by the ISP pre-processing logical module 542 can be transmitted to the controlling logical module 546. For example, the image statistics may include statistics of the image sensor 514, such as an auto exposure, an auto white balance, an auto focus, a flicker detection, a black level compensation, a shading correction for the lens 512, and the like. The controlling logical module 546 can include a processor and/or a microcontroller configured to execute one or more routines, such as firmware. The one or more routines can determine a controlling parameters for controlling the imaging device 510 and the controlling parameters for controlling the ISP pipelines, based on the image statistics. For example, the controlling parameters may include controlling parameters (e.g., gain, integration time for exposure control) for controlling the sensor 520, controlling parameters for controlling a camera flash, controlling parameters (e.g., focus or zoom in-focus distance) for controlling the lens 512, or any combination of these parameters. The controlling parameters for ISP may include a gain levels and color correction matrices for automatic white balance and color adjustment (e.g., during RGB processing), as well as shading correction parameters for the lens 512.

The following operations are performed to achieve the focusing method, by applying the image processing technique of FIG. 6.

At operation (101), obtaining an in-focus distance which is corresponding to an in-focus lens position of the first camera that is in focus, may be obtained when the first camera has been in focus. The in-focus distance indicates an in-focus position of the lens of the first camera. The in-focus position indicates a position of the lens of the first camera, at which the first camera is in focus.

In some embodiment, at operation (101), when a rear camera module of a mobile terminal is a dual-camera module including two cameras, the dual-camera module can be used for focusing. In general, a dual-camera module may include a common camera and a depth camera. In some embodiments, the dual-camera module may include a color camera and a black-and-white camera. In other embodiments, the dual-camera module may include a wide camera and a telephoto camera. Different shooting effects may be achieved by different dual-cameral module. The first camera refers to a main camera of the rear camera module of the mobile terminal. When the rear camera module of the mobile terminal is a dual-camera module having a main camera and a secondary camera, the main camera and the secondary camera of the dual-camera module can be distinguished according to camera ID (identification)s thereof. For example, in the mobile terminal, a camera ID may be determined as 0 for indicating the main camera, and a camera ID may be determined as 1 for indicating the secondary camera, and a camera ID may be determined as 2 for a front camera of the mobile terminal. When a camera application in the mobile terminal is activated and starts to focus, the mobile terminal may search for the main camera according to the camera ID thereof, and move a lens of the main camera to focus. In an operation of moving the lens of the main camera to focus, the main camera may perform a first scanning operation to obtain a location range of an in-focus lens position of the first camera that is in focus; then the main camera may perform a second scanning operation to obtain the in-focus lens position that is in focus, after the location range of the in-focus position is obtained. After obtaining the in-focus lens position, the mobile terminal may obtain an in-focus distance corresponding to the in-focus position. When the lens of the main camera are moved, by the mobile terminal, to arrive at the in-focus position, an image captured by the main camera, is in focus. In other words, the image captured by the mobile terminal is clear. The in-focus distance indicates a straight-line distance between the lens of the main camera and an object on which the first camera is focusing on.

At operation (102), obtaining an in-focus lens position of a second camera, which is corresponding to the in-focus distance.

In some embodiment, at operation (102), the second camera refers to the secondary camera of the rear camera module of the mobile terminal. The main camera and the secondary camera are distinguished according to the camera IDs thereof. The main camera and the secondary camera may have different numbers of pixels, or may have the same numbers of pixels. The mobile terminal pre-stores correspondences between the in-focus distance and the in-focus lens position of every camera. When the rear camera module includes multiple cameras, and specifications of the cameras are different from each other, the correspondences, between the in-focus distance and the in-focus lens position of each of the cameras, may be different. A correspondence map of the camera ID, the in-focus lens position, and the in-focus distance may be pre-stored in the mobile terminal. After obtaining the in-focus distance corresponding to the in-focus lens position of the main camera that is in focus, the in-focus lens position of the secondary camera, which is corresponding to the in-focus distance, can be obtained by searching correspondingly up in the correspondence map. As illustrated in Table 1, a correspondence map of the in-focus lens position of every camera, and the in-focus distance is illustrated.

At operation (3), moving the second camera to the in-focus position that indicates the second camera is in focus, and the second camera is focusing during movement.

In some embodiment, at operation (3), the mobile terminal may move the lens of the secondary camera to the in-focus lens position by activate a motor, when the in-focus position, that indicates the second camera is in focus, is obtained by the mobile terminal. And the mobile terminal may obtain an in-focus area when moving the secondary camera to focus. In some embodiments, operations of moving the lens of the secondary camera to focus is the same as the operations of moving the lens of the main camera to focus.

In one embodiment, before the in-focus distance corresponding to the in-focus distance of the lens of the first camera is obtained, the focusing method further includes the following operations: driving the first camera to focus; obtaining a current position of the first camera at the time when a current frame of image is in focus, and determining the in-focus lens position of the first camera as the current position corresponding the current frame of image that is in-focus.

Before the mobile terminal obtains the in-focus distance corresponding to the in-focus lens position of the main camera, the main camera is driven to focus by the mobile terminal, and the mobile terminal is configured to determine whether or not the current frame of image is in focus. The operation of determining whether or not the current frame of image is in focus may include the following operations: driving the lens of the main camera to perform a pre-scanning, and obtaining every focus value corresponding to every frame of image when the lens of the main camera is scanning, which is captured by the first camera during the moving of the first lens module; and the pre-scanning is stopped and an accurate scanning is performed at the time when the focus value corresponding to the current frame of image is smaller than that of a previous frame. In the pre-scanning process, a movement of the main camera is relatively large at each time of approaching. After the pre-scanning is finished, the mobile terminal drives the lens of the main camera to perform the accurate scanning. In the accurate scanning process, the lens of the main camera is moved and retreated, and the movement of the lens of the main camera is relatively smaller than that in the pre-scanning process. When a focus value of an intermediate frame of three consecutive frames of images is greater than the focus value of each of a previous and a consecutive frames of the intermediate frame, the accurate scanning is stopped. A fitted parabola is forming according to the focus values corresponding to the three consecutive frames of images. And the lens of the first camera is moved according to the fitted parabola. The main camera is determined as in focus at the time when the lens arrives at a position corresponding to the vertex of the fitted parabola. When the mobile terminal determines that the main camera has been in focus and the current frame of image is in focus, the lens position corresponding to the current frame of image is recorded as the in-focus lens position when the main camera has been in focus.

In one embodiment, before the in-focus distance corresponding to the in-focus lens position of the first camera is obtained, the focusing method further includes the following operations: driving the first camera to focus; obtaining every position corresponding to every frame of image when the lens of the camera is moving; determining the lens position corresponding to a frame of image that is in focus as the in-focus lens position of the first camera.

Before the mobile terminal obtains the in-focus distance corresponding to the in-focus lens position of the main camera, the main camera is driven to focus by the mobile terminal, and the terminal is configured to records a current position corresponding to the current frame of image. At the time when the current frame of image is determined as in focus, an in-focus lens position, corresponding to an in-focus frame of image, is obtained; and the mobile terminal may search for the in-focus distance corresponding to the in-focus position.

In one embodiment, correspondences of device identification number of every camera, the lens positions of every camera, and the in-focus distance are pre-stored in the mobile terminal. The operation, of obtaining an in-focus distance corresponding to the in-focus lens position of a first camera that is in focus, may include the following operations: obtaining the device identification number of the first camera; searching for the in-focus distance corresponding to the in-focus lens position of the first camera that is in focus, according to the device identification number of the first camera. The operation, of obtaining an in-focus lens position of the second camera, which is corresponding to the in-focus distance, may include the following operations: obtaining the device identification number of the second camera; and searching for, according to the device identification number of the second camera, the in-focus lens position of the second camera, which is corresponding to the in-focus distance.

Correspondences of device identification numbers of every camera, the lens positions of every camera, and the in-focus distance are pre-stored in the mobile terminal.

Different cameras with different device identification numbers may have different in-focus distances that is corresponding to the in-focus lens positions of the cameras. When the main camera has been in focus, the mobile terminal may obtain the in-focus position of lens of the main camera, and configured to search for, according to the device identification numbers and the lens position of the main camera, the in-focus distance corresponding to the in-focus lens position of the main camera. After obtaining the in-focus distance, the mobile terminal may search for the lens position of the secondary camera, which is corresponding to the in-focus distance. The device identification number of the camera is a string for uniquely identifying the corresponding camera, such as a camera ID.

In one embodiment, the first camera and the second camera capture images simultaneously when the second camera has been in focus.

When the second camera has been in focus, the mobile terminal is configured to capture images with the first camera and the second camera simultaneously. In the focusing method according to the embodiments of the present disclosure, both of the first camera and the second camera are simultaneously used for capturing images when the dual-camera module is in focus, which ensures a better consistency of the images and improves a quality of a processed image that is processed according to the images captured by the first camera and the second camera.

As illustrated in FIG. 2, a mobile terminal 100 is provided, in accordance with another embodiment of the present disclosure. The mobile terminal 100 may include a housing 201, a display panel 203, and a camera module 205. The housing 201 includes a rear cover 2011 and a front cover 2013 opposite to the rear cover 2011. The display panel 203 is attached to the front cover 2013. The camera module 205 may be a rear camera module of the mobile terminal 200. The camera module 205 may be disposed in the housing 201, and both exposed from the rear cover 2011 so as to capture an image of outside environment. The camera module 205 may focus on a target object when capturing images by applying the focusing method according to the embodiments of the present disclosure. In some embodiments, the camera module 205 may include a first camera 2051 and a second camera 2053 adjacent to the first camera 2051. Such that the rear camera module is a dual-camera module, and the images capture by the dual-camera module may have a high quality.

In an alternative embodiment, the camera module 205 may be a front camera module of the mobile terminal 200, and both exposed from the front cover 2013.

In some embodiments, the first camera 2051 may include a first lens module having at least one first lens. The first lens module is configured to move and focus on a target object when the first camera 2051 captures images. When the first camera 2051 has been in focus, the first lens module is disposed at a first in-focus position. The first in-focus position is a position of the at least one first lens at which the first camera 2051 is in focus, and the image capture by the first camera 2051 is clear at the target object.

When the first camera 2051 has been in focus, an in-focus distance may be defined by the target object and the first lens module. The in-focus distance indicates a straight-line distance between the first lens module and the target object.

The second camera 2053 may include a second lens module having at least one second lens. The second lens module is configured to move and focus on a target object when the second camera 2053 captures images. When the second camera 2053 has been in focus, the second lens module is disposed at a second in-focus position. The first in-focus position is a position of the at least one second lens at which the second camera 2053 is in focus, and the image capture by the second camera 2053 is clear at the target object.

When the camera module 205 has been in focus, both of the first camera 2051 and the second camera 2053 are in focus. A straight-line distance between the first lens module and the target object, may be substantially equal to a straight-line distance between the second lens module and the target object. Thereby, the in-focus distance may indicate a straight-line distance between the rear camera module and the target object.

Figure 7:
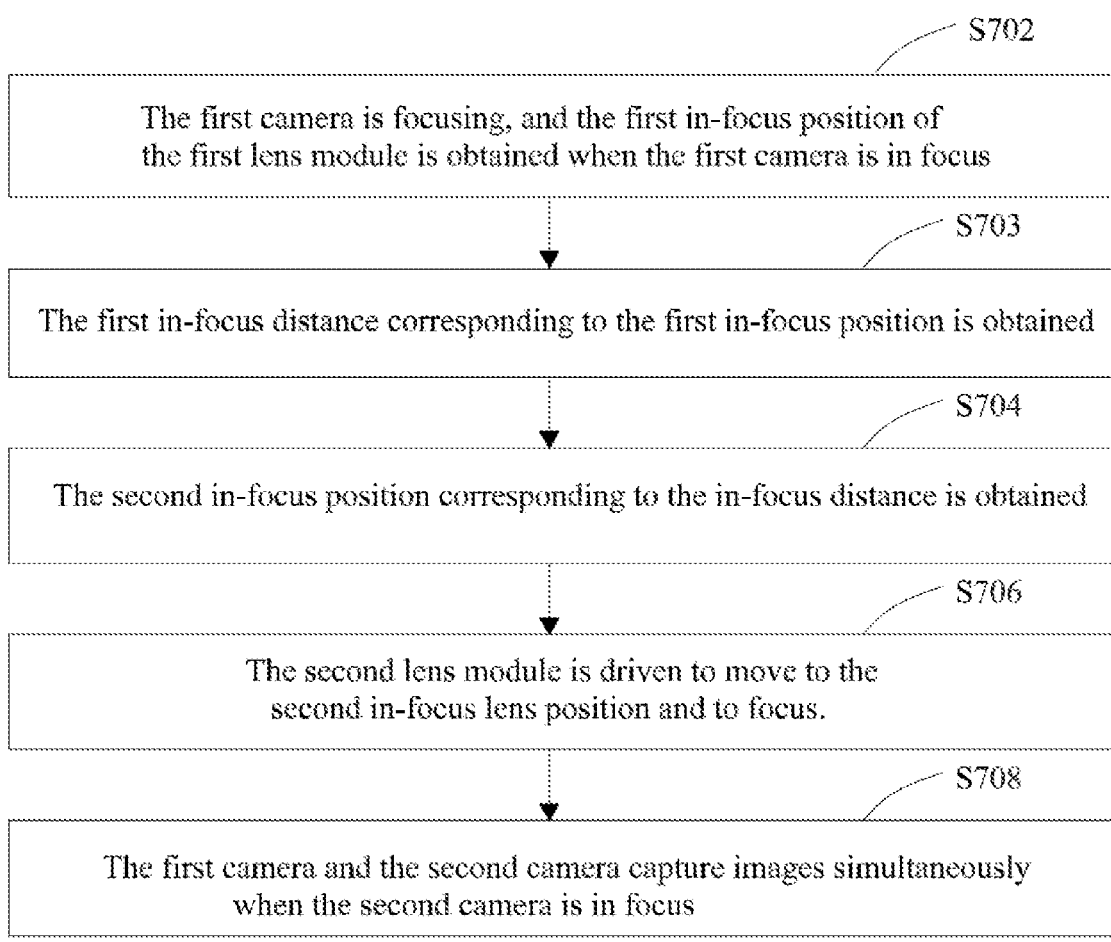
FIG. 7 illustrates a schematic flowchart of a focusing method, in accordance with further another embodiment of the present disclosure.

When capturing images, the mobile terminal 200 may drive the first lens module to focus and obtain the in-focus distance, and then determine, basing on the in-focus distance, the second in-focus position of the second lens module, and drive the second lens module to focus, by applying a focusing method illustrated in FIG. 7. FIG. 7 illustrates a schematic flowchart of a focusing method, in accordance with still another embodiment of the present disclosure. The focusing method is applied in the mobile terminal in FIG. 2. As illustrated in FIG. 7, the focusing method may begin at block S702.

At block S702, the first camera is focusing when the first lens module is moving to focus, and the first in-focus position of the first lens module is obtained when the first camera has been in focus. The first in-focus position indicates a position at which the first camera is in focus. The first camera is in focus at the time when the first lens module is in focus. And the first lens module is stopped from moving when the first camera is in focus.

In some embodiment, the first camera starts to focus according on an input of a user. For example, the user operates the mobile terminal to activate the camera module, and an image is displayed on the display panel when the cameral module is working. When taking a photo, the user may determine a desire in-focus area on the image. The desire in-focus area is corresponding to a target object, and indicates an area of the image, in which the target object will be substantially clear displayed. The mobile terminal then drive the first camera to focus according to the desire in-focus area that is determined by the user. In other embodiments, the desire in-focus area may be determined by the mobile terminal automatically, according to the target object.

In this case, an operation of driving the first camera to focus, may include: receiving an input from a user, and activating the camera module according to the input; displaying an image capture by the camera module, and obtaining a desire in-focus area in the image; and moving the first lens module until the first camera is in focus, according to the desire in-focus area.

The mobile terminal may drive the first camera to focus by moving the first lens module along an optical axis thereof, and the first camera keeps taking images during the moving. A current position of the first lens module is obtained at the time when a current frame of image captured by the first camera that has been in focus. The first camera keeps capturing images during the first lens module is focusing, and the current frame of image is one of the images captured at a moment during the focusing. The first lens in-focus position is determined as the current position of the first lens module corresponding the current frame of image that is in-focus.

In some embodiment, before the mobile terminal obtains the in-focus distance corresponding to the first lens in-focus position, the first camera is driven to focus by the mobile terminal, and the mobile terminal is configured to determine whether or not the current frame of image capture by the first camera is in focus.

The operation of determining whether or not the current frame of image is in focus may begin from block S7021 to block S7029.

At block S7021, the first lens module is driven to perform a pre-scanning, and every focus value corresponding to every frame of image is obtained when the first lens module is scanning, which is captured by the first camera during the moving of the first lens module. In the pre-scanning process, the first lens module moves, at a first speed, along a first direction.

At block S7023, at the time when the focus value corresponding to the current frame of image is smaller than that of a previous frame, the first lens module stop to perform an accurate scanning. In the accurate scanning process, the first lens module moves, at a second speed smaller than the first speed, and along a second direction opposite to the first direction.

In the following operation, the first camera may be determined as in focus according to the accurate scanning process.

At block S7025, a first focus value, a second focus value, and a third focus value of consecutive three frames of image may be obtained when the first camera performs the accurate scanning, while the first focus value is corresponding to a an intermediate frame of the consecutive three frames, and the second focus value is corresponding to a previous frame before the intermediate frame, and the third frame is corresponding to a consecutive frame of after the intermediate frame. When the first focus value is greater than each of the second focus value and the third focus value, the first camera stops scanning.

At block S7027, a parabola is fitted according to the first focus value, the second focus value, and the third focus value. And the first lens module is moved according to the fitted parabola.

At block S7029, the first camera and the current frame of image is determined as in focus at the time when the first lens module arrives at a position corresponding to a vertex of the fitted parabola.

When the mobile terminal determines that the first camera has been in focus and the current frame of image has been in focus, the lens position of the first lens module corresponding to the current frame of image is recorded as the first lens in-focus position.

At block S703, the first in-focus distance corresponding to the first lens in-focus position is obtained.

In some embodiment, the first is configured with a first camera ID, and the second camera is configured with a second camera ID. The first camera and the second camera can be distinguished basing on the first camera ID and the second camera ID.

When a camera application in the mobile terminal is activated and involves the rear camera module to capture images, the mobile terminal may search for the first camera basing on the first camera ID, and move the first lens module to focus. In an operation of moving the lens of the first camera to focus, the first camera may perform a first scanning to obtain a location range of the first lens in-focus position of the first lens module; then the first camera may perform a second scanning to obtain the first lens in-focus position when the location range of the first lens in-focus position is obtained. After obtaining the first lens in-focus position, the mobile terminal may obtain the in-focus distance corresponding to the first lens in-focus position. When the first lens module is moving to the lens in-focus position, an image captured by the first camera has been in focus. Thereby the image captured by the mobile terminal is clear.

At block S704, the second lens in-focus position corresponding to the in-focus distance is obtained. The second lens in-focus position indicates a position at which the second camera is in focus.

The mobile terminal pre-stores a correspondence between the in-focus distance and the lens in-focus position of the lens module of each of the cameras. When the rear camera module includes multiple cameras, and specifications of the cameras are different from each other, the correspondences, between the in-focus distance and the lens in-focus position of the lens of each of the cameras, may be different. A correspondence map of the camera IDs, the lens in-focus position of the lens modules, and the in-focus distance may be pre-stored in the mobile terminal.

At block S704, after the in-focus distance corresponding to the first lens in-focus position is obtained, the second lens in-focus position corresponding to the in-focus distance can be obtained by searching correspondingly up in the correspondence map. As illustrated in Table 3, a correspondence map of the camera IDs, the lens in-focus position of the lens modules, and the in-focus distance may be pre-stored in the mobile terminal is illustrated.

Table 3 correspondence map of the lens in-focus position of the lens and the in-focus distance

TABLE 3 correspondence map of the lens in-focus position of the lens and the in-focus distance

| First camera ID<br>First lens in-focus<br>position (mm) | second camera ID<br>Second lens in-focus<br>position (mm) | In-focus distance<br>(cm) |
| --- | --- | --- |
| 0.1 | 0.05 | 20 |
| 0.2 | 0.1 | 40 |
| 0.3 | 0.15 | 60 |
| 0.6 | 0.3 | 120 |
| 2.5 | 1.25 | 500 |

At block S706, the second lens module is driven to move to the second in-focus position and to focus. The mobile terminal may move the second lens module to the second lens in-focus position by activate a motor.

At block S708, the first camera and the second camera capture images simultaneously when the second camera has been in focus.

In the focusing method according to the embodiments of the present disclosure, the first camera and the second camera are focusing on substantially identical focus area according to the correspondence map of the lens in-focus position of the lens and the in-focus distance. Thereby a quality of a processed image based on two images respectively captured by the first camera and the second camera is improved.

One of ordinary skill in the art can understand that all or part of the process of implementing the above embodiments can be completed by a computer program to instruct related hardware, and the program can be stored in a non-volatile computer readable storage medium. The program, when executed, may include the flow of any embodiment of the methods as described above. The storage medium may be a magnetic disk, an optical disk, a read-only memory (ROM), or the like.

The principles and embodiments of the present disclosure are described in the above examples. The description is only used for helping to understand the technical solution of the present disclosure and its core idea. Those of ordinary skill in the art should understand that it can still modify the technical solutions described in foregoing embodiments, or replace some of the technical features. The modifications or substitutions do not depart from the scope of the technical solutions of the embodiments of the present disclosure.

What is claimed is:

1. A focusing method applied in a mobile terminal; the mobile terminal comprising a first camera having a first lens module and a second camera having a second lens module; the second camera being adjacent to the first camera; wherein correspondences of device identification number of every camera, a first in-focus position, a second in-focus position and an in-focus distance are pre-stored in the mobile terminal, the first in-focus position indicates a position at which the first lens module is in focus, and the second in-focus position indicates a position at which the second lens module is in focus, and the focusing method comprises:

obtaining the device identification number of the first camera;

searching for the in-focus distance corresponding to the first in-focus position, according to the device identification number of the first camera and the correspondences of device identification numbers of the first camera and the second camera, the first in-focus position, the second in-focus position, and the in-focus distance;

obtaining the second in-focus position of the second lens module corresponding to the searched in-focus distance, wherein the second in-focus position indicates a position at which the second lens module is in focus; and driving the second lens module to move to the second in-focus position and to focus.

2. The focusing method according to claim 1, wherein before the operation of obtaining the device identification number of the first camera, the focusing method further comprises:

moving the first lens module to focus along an optical axis thereof, wherein the first camera keeps taking images while the first lens module is moving; and obtaining the first in-focus position of the first lens module when the first lens module has been in focus.

3. The focusing method according to claim 2, wherein, the operation of obtaining the first in-focus position of the first lens module when the first lens module has been in focus comprises:

obtaining a current position of the first lens module at a time when a current frame of image is in focus, wherein the current frame of image is one of the images captured at a moment during moving the first lens module to focus along the optical axis; and determining the first in-focus position as the current position corresponding to the current frame of image that is in focus.

4. The focusing method according to claim 2, wherein the operation of obtaining the first in-focus position of the first lens module when the first lens module has been in focus, comprises:

obtaining every position of the first lens module corresponding to every frame of image, which is captured by the first camera during the focusing; and determining the position corresponding to a frame of image that is in focus as the first in-focus position.

5. The focusing method according to claim 2, wherein the operation of moving the first lens module to focus along an optical axis thereof comprises:

receiving an input from a user, and activating the first camera according to the input;

displaying an image captured by the first camera, and obtaining a desired in-focus area in the image;

moving the first lens module to focus along an optical axis thereof, according to the desired in-focus area; and stopping the moving of the first lens module when the first camera is in focus.

6. The focusing method according to claim 2, wherein the operation of moving the first lens module to focus comprises:

moving, along a first direction and at a first speed, the first lens module to perform a pre-scanning;

obtaining every focus value corresponding to every frame of image, which is captured by the first camera during the moving of the first lens module;

stopping the first lens module to perform an accurate scanning, when the focus value corresponding to a current frame of image is smaller than that of a previous frame, wherein in the accurate scanning process, the first lens module moves at a second speed smaller than the first speed, and along a second direction opposite to the first direction; and determining that the first lens module is in focus according to the accurate scanning process.

7. The focusing method according to claim 6, wherein in the accurate scanning process, the first lens module is moved and retreated, and movement of the first lens module is smaller than that in the pre-scanning process.

8. The focusing method according to claim 6, wherein, the operation of determining that the first camera is in focus according to the accurate scanning process, comprises:

stopping the moving of the first lens module when a focus value of an intermediate frame of three consecutive frames of images is greater than the focus values of the other two frames of images;

forming a fitted parabola according to the focus values of the three consecutive frames of images;

moving the first lens module according to the fitted parabola; and determining the first lens module as in focus at a time when the first lens module arrives at a position corresponding to a vertex of the fitted parabola.

9. The focusing method according to claim 1, wherein, the operation of obtaining the second in-focus position corresponding to the searched in-focus distance according to the first in-focus position, comprises:

obtaining the device identification number of the second camera; and searching for the second in-focus position corresponding to the searched in-focus distance, according to the device identification number of the second camera and the correspondences of device identification numbers of the first camera and the second camera, the first in-focus position, the second in-focus position, and the in-focus distance.

10. The focusing method according to claim 1, further comprising:

capturing images via the first camera and the second camera simultaneously when the second camera has been in focus.

11. The focusing method according to claim 1, wherein the in-focus distance indicates a straight-line distance between the first lens module and a focus of an image.

12. A mobile terminal comprising:

a first camera having a first lens module;

a second camera having a second lens module, wherein correspondences of device identification numbers of the first camera and the second camera, a first in-focus position, a second in-focus position, and an in-focus distance are pre-stored in the mobile terminal, the first in-focus position indicates a position at which the first lens module is in focus and the second in-focus position indicates a position at which the second lens module is in focus;

a memory; and a processor, wherein the memory stores a computer program, and the processor is configured to execute the computer program to perform the operations of:

obtaining the device identification number of the first camera;

searching for the in-focus distance corresponding to the first in-focus position, according to the device identification number of the first camera and the correspondences of device identification numbers of the first camera and the second camera, the first in-focus position, the second in-focus position, and the in-focus distance;

obtaining the second in-focus position of the second lens module corresponding to the searched in-focus distance; and driving the second lens module to move to the second in-focus position and to focus.

13. The mobile terminal according to claim 12, wherein when obtaining the first in-focus position of the first lens module when the first lens module has been in focus, the processor is configured to execute the computer program to perform the operations of:

moving the first lens module along an optical axis thereof, wherein the first camera keeps taking images during the moving;

obtaining every position of the first lens module corresponding to every frame of image which is captured by the first camera during the moving; and determining the position corresponding to a frame of image that is in focus as the first in-focus position.

14. The mobile terminal according to claim 12, wherein before obtaining an in-focus distance corresponding to a first in-focus position of the first lens module when the first camera has been in focus, the processor is further configured to execute the computer program to perform the operations of:

driving the first lens module to focus; and obtaining the first in-focus position of the first lens module when the first lens module has been in focus.

15. The mobile terminal according to claim 14, wherein, when obtaining the first in-focus position of the first lens module when the first lens module has been in focus, the processor is configured to execute the computer program to perform the operations of:

obtaining a current position of the first lens module at a time when a current frame of image is in focus, wherein the first camera keeps capturing images while the first lens module is focusing, and the current frame of image is one of the images captured at a moment during the focusing; and determining the first in-focus position as the current position corresponding to the current frame of image that is in focus.

16. The mobile terminal according to claim 14, wherein when driving the first lens module to focus, the processor is configured to execute the computer program to perform the operations of:

receiving an input from a user, and activating the first camera according to the input;

displaying an image capture by the first camera, and obtaining a desired in-focus area in the image; and moving, according to the desired in-focus area, the first lens module until the first camera is in focus.

17. The mobile terminal of claim 12, wherein, when obtaining the second in-focus position corresponding to the in-focus distance according to the first in-focus position, the processor is configured to execute the computer program to perform the operations of:

obtaining the device identification number of the second camera; and searching for the second in-focus position corresponding to the searched in-focus distance, according to the device identification number of the second camera and the correspondences of device identification numbers of the first camera and the second camera, the first in-focus position, the second in-focus position, and the in-focus distance.

18. The mobile terminal according to claim 12, wherein the processor is further configured to execute the computer program to capture images via the first camera and the second camera simultaneously when the second camera has been in focus.

19. The mobile terminal according to claim 12, further comprising a housing; the first camera and the second camera are juxtaposed in the housing and both exposed from the housing.

* * * * *